United States Patent [19]

Kramer

[11] Patent Number: 4,563,981
[45] Date of Patent: Jan. 14, 1986

[54] GROUP TETHER APPARATUS

[76] Inventor: Roy L. Kramer, 731 11th Ave. W., Kalispell, Mont. 59901

[21] Appl. No.: 670,054

[22] Filed: Nov. 9, 1984

[51] Int. Cl.$^4$ ............................................. A01K 29/00
[52] U.S. Cl. ...................................... 119/96; 119/109
[58] Field of Search ................. 119/96, 109; 114/253; 273/1 G

[56] References Cited

U.S. PATENT DOCUMENTS

| | | | |
|---|---|---|---|
| 1,147,914 | 7/1915 | Ayers | 214/86 |
| 1,914,612 | 6/1933 | Moeur, Jr. | 40/127 |
| 2,122,766 | 7/1938 | Wiemer | 40/127 |
| 2,275,983 | 3/1942 | Nadeau | 119/109 X |
| 2,314,504 | 3/1943 | Lifchultz | 242/98 |
| 2,412,895 | 12/1946 | Lewis | 87/8 |
| 3,000,652 | 9/1961 | Hawkins | 280/406 |
| 3,182,828 | 5/1965 | Ormsby | 214/86 |
| 3,563,208 | 2/1971 | Nero | 119/96 |
| 4,213,413 | 7/1980 | Courtney | 114/253 |

Primary Examiner—Hugh R. Chamblee
Attorney, Agent, or Firm—Burd, Bartz & Gutenkauf

[57] ABSTRACT

A group tether or control apparatus for imparting directional control to a group of individuals, such as children, on an outing or field trip, as when crossing a street or touring a building. The group operator has control of a main handle. A plurality of handle strings are releasably connected to the main handle and have a plurality of stations, each station including a secondary handle to be grasped by a group member. The secondary handles are connected by line segments which can carry pennants to identify the group or alert others, such as motorists, to the presence of the group. Handle strings are detached or attached to the main handle as needed. The group leader leads the group by walking ahead with the main handle, and the group members follow by maintaining a grasp on the secondary handles.

14 Claims, 5 Drawing Figures

U.S. Patent  Jan. 14, 1986  4,563,981

Figure 1:
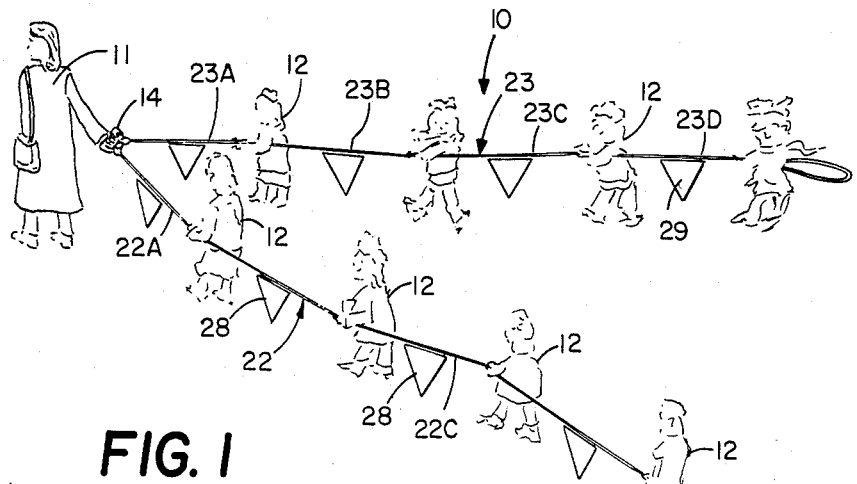
Figure 2:
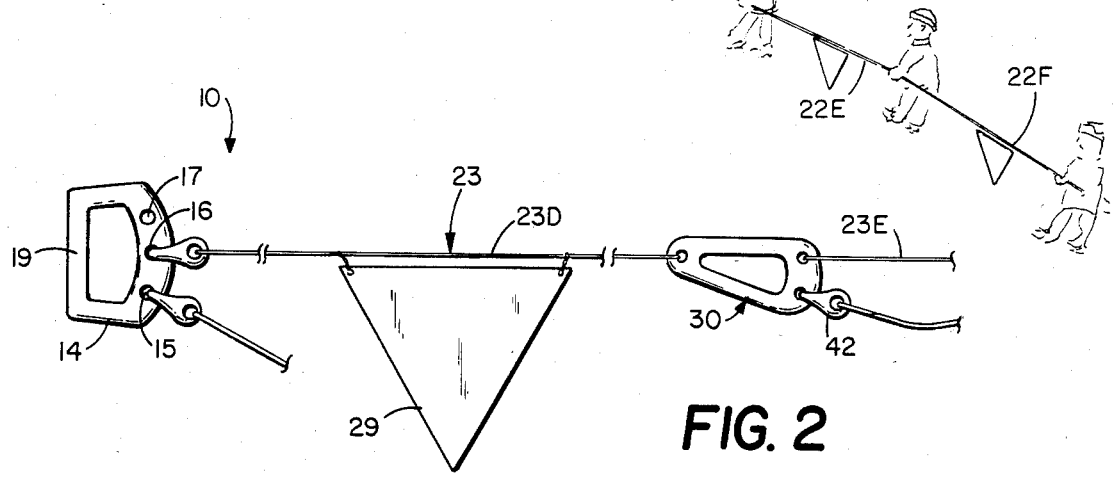
Figures 3, 4, 5:
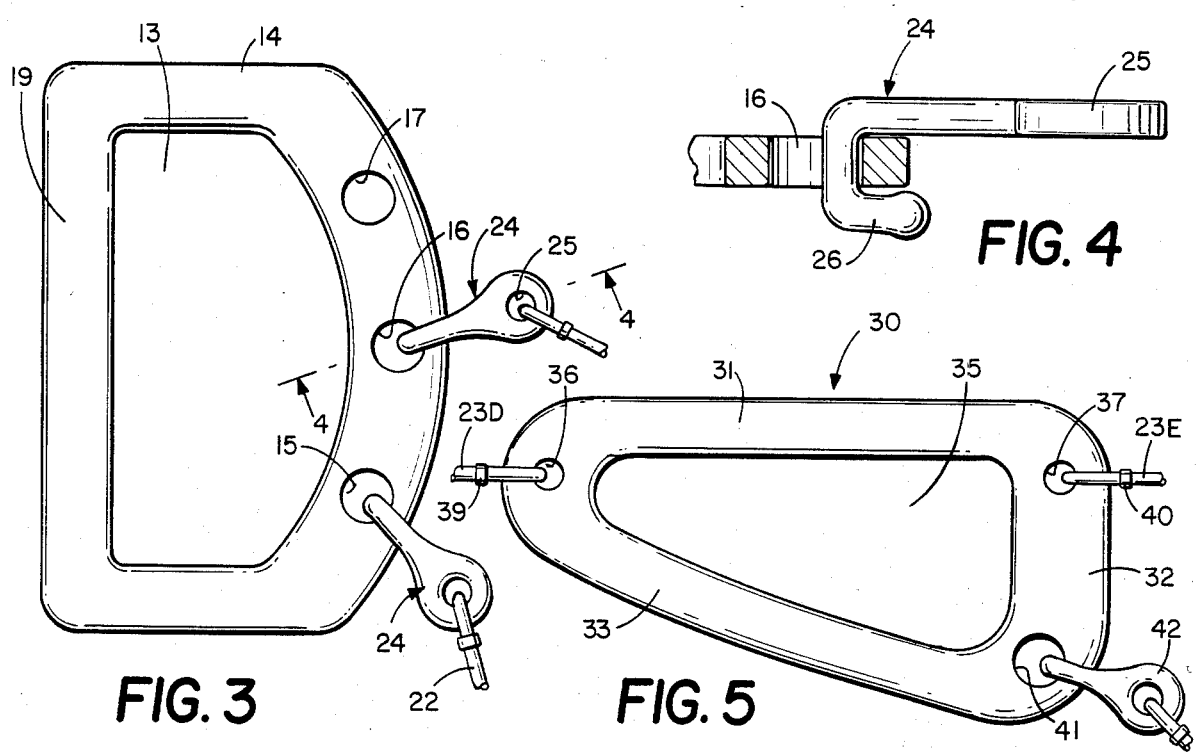

GROUP TETHER APPARATUS

BACKGROUND OF THE INVENTION

Control of a group of children, such as those of primary or preschool age, on an outing or field trip by a single individual is a difficult task under the best of circumstances. Children have short attention spans and are prone to wander about, forget directions, and talk and play among themselves in lieu of paying attention to the leader. This can lead to an unorderly group with resultant confusion and even attendant danger when crossing a street or when a child becomes lost. Such a group of individuals is best kept as orderly as possible when there are a number of them together on an outing.

SUMMARY OF THE INVENTION

The invention pertains to a group control or tether apparatus for maintaining directional organization among members of a group, particularly such as a group of children as when on an outing. Each individual group member need only follow the easy-to-remember instruction to hold an individual handle of the apparatus. A main handle is held by the group leader. One, two or three handle strings are connected to the main handle. Each handle string has a plurality of linearly aligned individual handles separated by line segments. There are preferably no more than about six individual handles to a line. Group members each hold a handle and are led around by the leader. Means are provided for shortening a handle string when less than all of the handles of the string are in use. Totally unused handle strings are detachable from the main handle. Signal pennants can be appended to the line segments separating the individual handles of a handle string.

IN THE DRAWINGS

FIG. 1 is a view of a group tether apparatus of the invention in use by a leader to impart directional control to a group of children;

FIG. 2 is an enlarged fragmented view in elevation of the group tether apparatus of FIG. 1;

FIG. 3 is an enlarged view of the main control handle of the apparatus of FIG. 2;

FIG. 4 is an enlarged sectional view of a portion of the main handle of FIG. 3 taken along the line 4—4 thereof; and FIG. 5 is an enlarged view of an individual control handle of the group tether apparatus of the invention.

DESCRIPTION OF A PREFERRED EMBODIMENT

Referring to the drawings, there is shown in FIG. 1 a group tether apparatus indicated generally at 10 operatively held by a group leader 11 and in use to impart directional control to a group of individuals shown to comprise a plurality of individual children 12. Each of the children 12 grasps a portion of the apparatus 10 and need only remember the single instruction to maintain grasp of the apparatus. Leader 10 can then move from place to place, crossing streets, going into and out of buildings and the like, without having frequently to stop and organize or look for the children 12. By quick observation of apparatus 10, leader 11 can determine that all the children 12 are present and assembled in orderly fashion conveniently spaced apart from one another.

Referring to FIGS. 2 and 3, a group tether apparatus 10 includes a main handle 14 having a central hand opening 13 and mounting openings 15, 16 and 17. Main handle 14 is generally D-shaped and has a linear portion 19 opposite the rounded portion carrying the mounting holes 15–17 for grasping by the group leader 11.

Mounting openings 15, 16, 17 permit releasable attachment of one, two or three handle strings carrying individual or second handles for grasping by the group members. As shown in the drawings, first and second openings 15, 16 carry first and second releasable handle strings 22, 23. At the leading edge of each handle string is a mounting or snap hook 24 having an eye 25 and a hook 26 (see FIG. 4). The hook 26 engages the corresponding mounting hole on main handle 14 and is releasable therefrom when the particular handle line is not needed. As shown in the drawings, two handle lines and two corresponding mounting openings of the main handle 14 are in use. There is provision for one more handle line. Alternatively, one less could be in use if warranted by a small enough number of group members.

Each handle string is comprised of a plurality of individual member handles separated by line segments extending linearly rearward from the leading snap hook 24. Each line segment can carry a colorful display pennant to provide a warning or other information pertaining to the group. As shown in FIG. 1, the first handle string 22 is provided with six handle stations, all of which are in use, and the stations are separated by line segments 22A through 22F. The leading end of front line segment 22A is connected to mounting hook 24. Each line segment carries a downwardly depending pennant 28. Only four of the handle stations are in use in FIG. 1 on the second handle string 23. The stations are separated by line segments 23A–23D. Each individual line segment carries a pennant or banner 29.

A typical handle station is shown in FIG. 2 with a handle shown enlarged in FIG. 5, depicting the last station in use in FIG. 1 of the second handle string 23 which has a trailing or leftover portion. The trailing end of line segment 23D is fixed to group member handle 30. As shown in FIG. 5, handle 30 is generally right triangular in shape, having an elongate leg 31 in line with the line segments 23, a short right-angle leg 32 extended perpendicularly from the rearward end of leg 31, and a hypotenuse 33. The legs 31, 32, 33 define a central handle opening 35 for accommodation of the fingers of the user. Line segment attachment openings 36, 37 are provided on handle 30 proximate the ends of the first elongate side 31. Line segment loops are formed passing through the line segment attachment openings and are held by metal clips. The rearward end of line segment 23D passes through the forward attachment opening 36 forming a loop which is closed by a metal clip 39. The forward end of the next rear line segment 23E passes through the rear line segment attachment opening 37 forming a loop which is closed by another metal clip 40.

A third opening is provided on handle 33 and is located at the intersection of the hypotenuse 33 and the second leg 32 and indicated at 41 in FIG. 5. The purpose of opening 41 is to provide for taking up excess line segments not in use. The extreme end of handle string 23 is provided with a mounting hook 42. Mounting hook 42 is of constructed like that of snap hook 24 as earlier described. Stations of each handle string are in use beginning from the forward station toward the rearward station. If one or more rearward stations are not in use, the trailing hook 42 is used to take up the unused stations. Trailing hook 42 is hooked into the handle of the last station in use as shown in FIG. 1, so as to minimize the amount of line dragging behind the last group member.

In use, one or more handle strings are assembled to main handle 14 according to the expected number of group members. Excess handle stations of a handle string are taken up by attaching the trailing hook 42 in the last used handle 30 if it is other than the last handle of the string. Each group member grasps one of the handles 30 and need only follow the relatively simple instruction to maintain a grasp on the handle. The group leader grasps the main handle 14 and conducts the group from place to place in orderly fashion. The pennants 28, 29 serve to identify the group or call attention to it so as to warn approaching motorists or the like.

Each handle string is preferably limited to a maximum of six stations, and a maximum of three handle strings per main handle is also preferable thereby maintaining a controllable size group. However, more or less handle stations and handle strings can be provided according to the nature of the group and the number of attendants. Other changes and deviations can be had from the embodiment described without departing from the scope and spirit of the invention.

The embodiments of the invention in which an exclusive property or privilege is claimed are defined as follows:

1. A group tether apparatus for providing directional control to a group of individual members, comprising:
   main handle means for control by a group leader;
   a plurality of handle strings, each string comprised of a plurality of linearly aligned second handles adapted to be grasped by the individual group members, a plurality of intermediate line segments connecting adjacent second handles on each handle string;
   first connecting means on the main handle means, each handle string having second connecting means for releasable connection to the first connecting means on the main handle means.

2. The group tether apparatus of claim 1 wherein: said first handle means is comprised as a D-shaped handle.

3. The group tether apparatus of claim 2 wherein: said first connecting means is comprised as a plurality of mounting openings in the D-shaped handle, each handle string having a mounting hook at the forward portion thereof engageable with a mounting opening on the D-shaped handle and comprising said second connecting means.

4. The group tether apparatus of claim 3 including: a plurality of pennants connected to line segments of the handle strings.

5. The group tether apparatus of claim 4 wherein: a second handle is triangular in shape with a central hand opening; forward and rearward line connecting openings, said line segments being connected to said line connecting openings.

6. The group tether apparatus of claim 5 including: a trailing hook rearwardly connected to each handle string, said second handles having trailing hook openings for connection with the trailing hook for storage of unused second handles and line segments.

7. The group tether apparatus of claim 6 wherein: said main handle has three mounting openings, and including three handle strings.

8. The group tether apparatus of claim 7 wherein: each handle string has six second handles.

9. The group tether apparatus of claim 1 wherein: each second handle is triangular in shape with a central hand opening, each having forward and rearward line connecting openings, said line segments being connected to said line connecting openings.

10. A group tether apparatus to control a group of individual members, comprising:
    a main handle for control by a group leader;
    a plurality of handle strings releasably connectable to the main handle;
    each handle string including a plurality of second handles, a plurality of intermediate line segments linearly connecting the second handles, a forward line segment being connected between a forward second handle and having a mounting hook at the opposite end thereof, said mounting hook being releasably connectable to said main handle.

11. The group tether apparatus of claim 10 wherein: said main handle is generally D-shaped with a central hand opening and a plurality of mounting openings for receipt of mounting hooks connected to the handle strings.

12. The group tether apparatus of claim 11 wherein: each second handle is generally triangular in shape having a central hand opening, and forward and rearwad line connecting openings, said line segments being connected to said line connecting openings.

13. A group tether apparatus of claim 12 including: a plurality of pennants connected to the line segments.

14. The group tether apparatus of claim 12 wherein: each handle string includes a trailing hook engageable with a second handle on the handle string to take up excess second handles and line segments.

* * * * *